Patented June 12, 1934

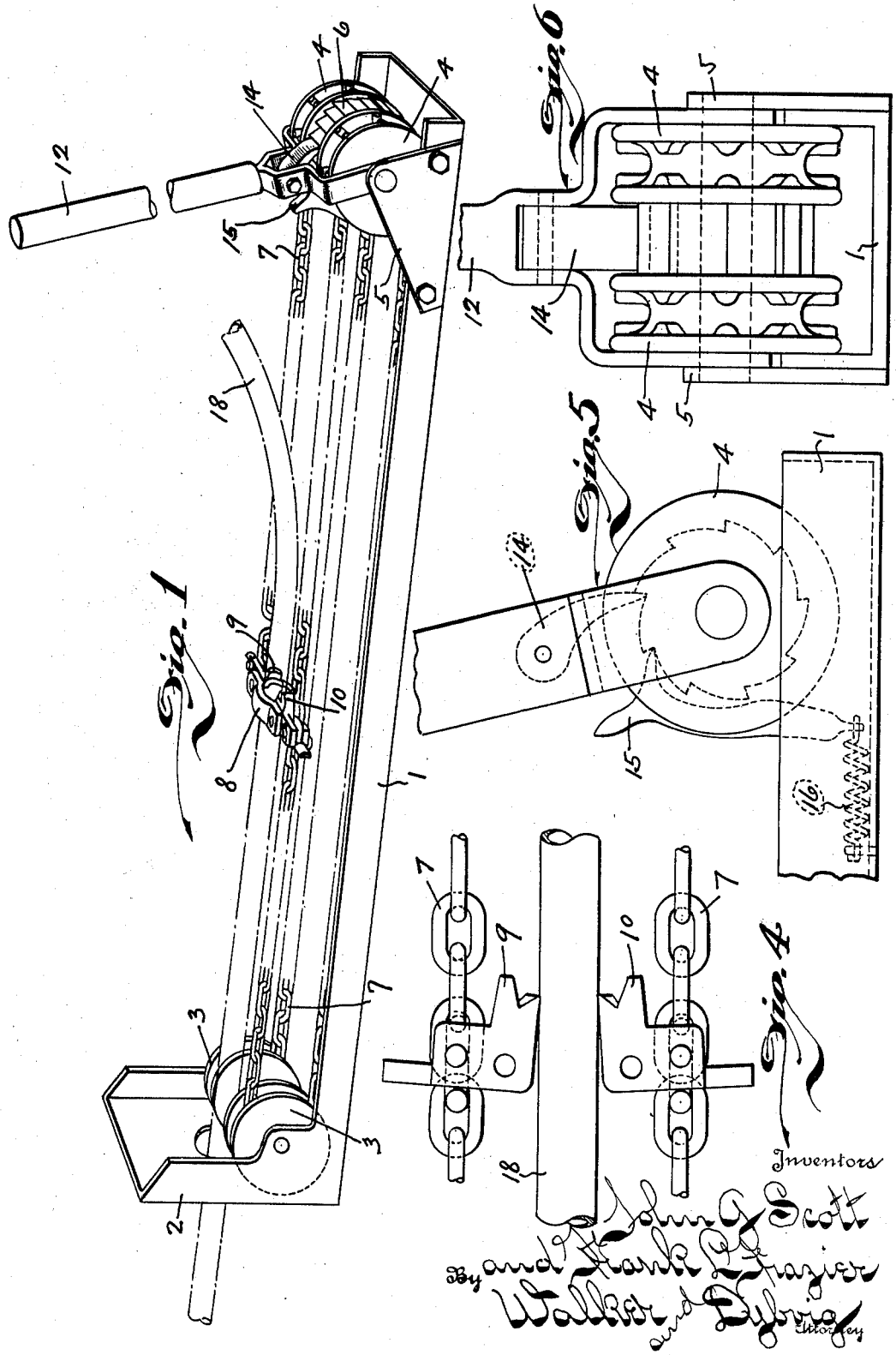

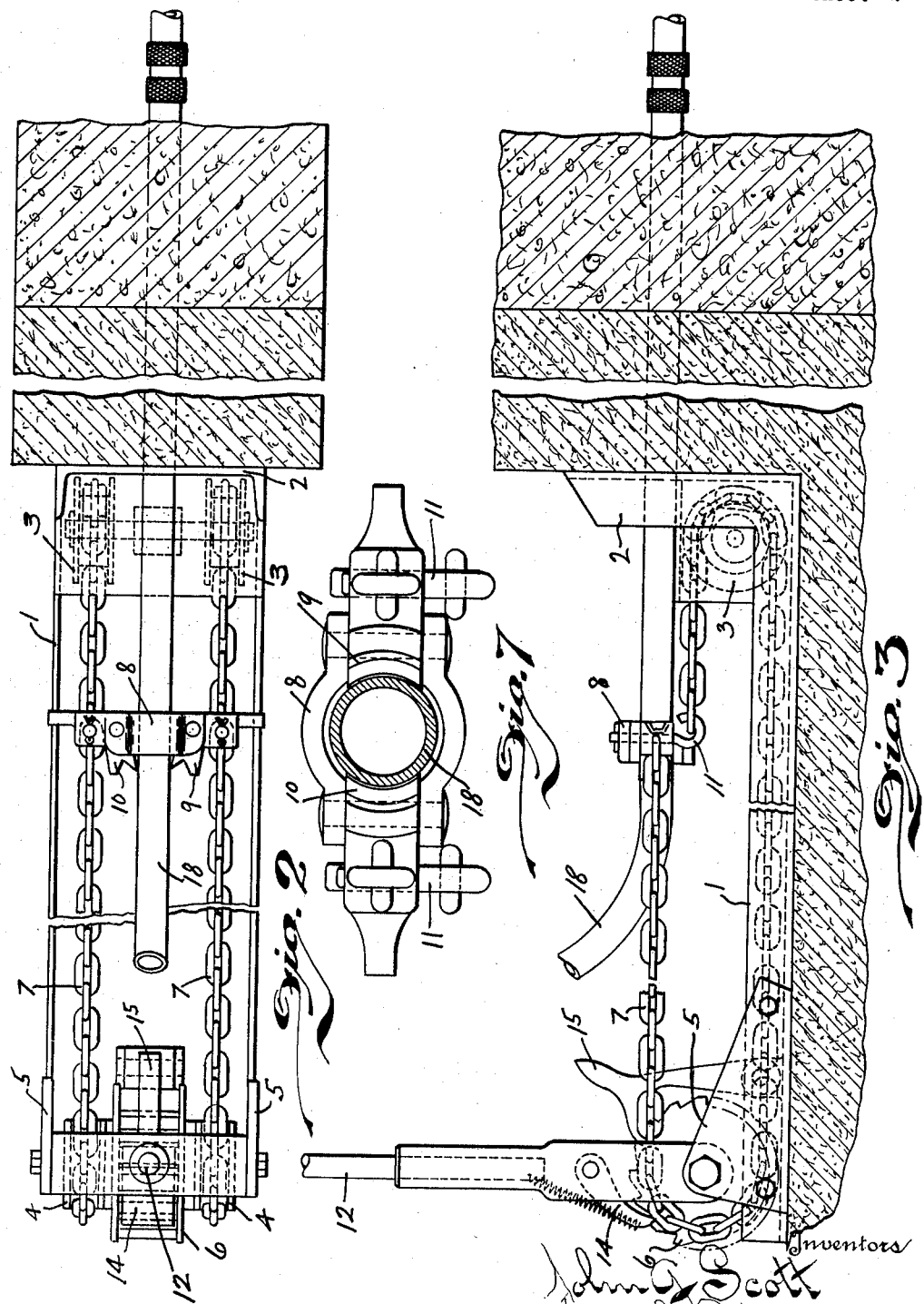

1,962,466

UNITED STATES PATENT OFFICE 1,962,466

PIPE PULLER

John G. Scott and Frank L. Fraizer, Troy, Ohio

Application February 27, 1932, Serial No. 595,540

8 Claims. (Cl. 254—29)

This invention relates to a pipe pulling apparatus for retrieving horizontal underground conduits such as gas and water pipes and if necessary replacing such withdrawn pipes or conduits with new material by drawing such new conduits into place as the old material is withdrawn.

The present apparatus is especially applicable to replacement of water and gas service lines extending underground from the supply main in the street into residences. The replacement of such conduits is not only difficult and expensive, but is highly objectionable due to the necessary excavation of street surfaces and lawns. The present apparatus is designed to enable the replacement of such conduits or pipes without the necessity of excavating more than a mere hole at one or both ends of the sections of conduits or pipes to be withdrawn. While especially desirable for removing and replacing house service lines, the device is also applicable generally to withdrawing pipe conduits in other localities and of various sizes and is capable of operating upon quite an extensive length of such conduits. The use of pulling devices for removing damaged pipes or conduits is not new, but applicant has devised an improved form of such apparatus.

The object of the invention is to simplify the construction as well as the means and mode of operation of pipe pulling devices, whereby they will not only be cheapened in construction, but will be more efficient in use, of great strength and powerful in operation, uniform in pulling action and unlikely to get out of repair.

A further object of the invention is to provide an apparatus which exerts a direct pulling influence in line with the pipe being operated upon, and which may be operated rapidly and conveniently.

A further object of the invention is to provide an apparatus which after having been operated to withdraw a given length of pipe may be readily and quickly readjusted for succeeding pulling operation.

A further object of this invention is to provide a device which exerts a direct pushing influence in line with the pipe being operated upon, and which may be operated rapidly and conveniently, and changed from a pushing to a pulling device or vice versa.

A further object of the invention is to provide such an apparatus having but few parts, of compact form and maximum strength.

With the above primary and other incidental objects in view as will more fully appear in the specification, the invention consists of the features of construction, the parts and combinations thereof, and the mode of operation, or their equivalents, as hereafter described and set forth in the claims.

Referring to the accompanying drawings, wherein is shown the preferred but obviously not necessarily the only form of the embodiment of the invention, Fig. 1 is a perspective view of the assembled pipe pulling apparatus forming the subject hereof. Fig. 2 is a top plan thereof. Fig. 3 is a side elevation. Fig. 4 is a detail plan view of the gripper jaws. Figs. 5 and 6 are respectively detail side and end elevations of the rotary actuating device.

Fig. 7 is a fragmentary view of the pipe grippers.

Like parts are indicated by similar characters of reference throughout the several views.

The present pulling apparatus comprises a length of structural steel channel beam 1, one end of which is turned upwardly at 2 to afford an abutment head for thrust engagement against a wall or the end of an excavation through which the pipe to be pulled projects. Mounted upon the channel frame 1 adjacent to its upturned end 2 is a pair of idler sheaves 3—3. At the opposite end of the channel frame 1 there is mounted a second pair of sheaves 4—4 supported in suitable brackets 5 and fixedly connected with an intermediate ratchet wheel 6. Extending about the sheaves 3 and 4 is a pair of endless chain belts 7—7. The chain belts 7—7 are interconnected by a cross head 8 upon which are pivoted two coacting clamp jaws 9 and 10. These jaws 9 and 10 are spaced apart on the cross head 8 and the ends of the active pulling portions of the chain belts 7 are connected to such pivoted jaws members 9 and 10 beyond their pivotal connections with the head 8 whereby the pulling strain upon such chain portions tends to oscillate the gripper jaws toward each other into clamping engagement with an interposed length of pipe as is shown in detail in Fig. 4.

While the engaging faces of the gripper jaws 9 and 10 may be of any suitable shape, the face of the jaw 9 is preferably eccentric with its pivotal center and is serrated, knurled or otherwise roughened to insure a secure nonslipping engagement with the pipe. The opposite gripper jaw 10 is preferably, though not necessarily, somewhat L shaped engaging the side of the pipe being pulled upon a comparatively flat bearing surface at right angles to the radius between the center of oscillation and the chain connection. The opposite or slack ends of the pulling chains 7 are attached to suitable ears 11 projecting from the under side of the cross head 8.

The chain belts are actuated by an oscillatory operating lever 12, the lower end of which is bifurcated and straddles the sheaves 4 and intermediate ratchet wheel 6 and is pivoted concentrically therewith upon a common trunnion shaft journaled in the side brackets 5. A pawl 14 carried by the operating lever operatively engages the ratchet wheel 6 to rotate the sheaves 4 with which the ratchet wheel is fixedly connected, and thereby exerts pulling influence upon the chain belts 7. The ratchet wheel 6 and pulling chains 7 are retained in the positions to which they have been adjusted by a detent pawl 15 actuated into engagement with the ratchet wheel by a spring 16. The upper end of the detent pawl 15 projects into the path of the operating lever 12 and is engaged thereby when the lever is moved to an extreme retracted position, to disengage the detent from the ratchet wheel 6 preparatory to retraction of the chain belts 7 for reengagement with a different portion of the pipe being pulled. A projecting portion carried by the detent pawl engages and lifts the actuating pawl 14 out of engagement with the ratchet wheel upon disengagement of the retaining pawl 15 therefrom, thus leaving the ratchet wheel free for reverse rotation as the chains and cross head are readjusted for a succeeding pulling operation.

The upturned end of the channel frame being abutted against the end of the excavation, or against a basement wall through which the pipe 18 to be pulled extends, with the pipe projecting through a hole 19 in such portion, the chain belts 7 are retrieved until the cross head 8 with the clamp jaws are in proximate relation with the sheaves 3. The protruding portion of the pipe is engaged between the pivoted gripper jaws, 9 and 10. The pulling strain exerted upon the chain belts 7 by the actuation of the ratchet wheel 6 and sheaves 4 is exerted upon the gripper jaws 9 and 10 tending initially to oscillate the jaws into firm gripping engagement with the pipe portion therebetween, and upon further advancing movement of the chains the pipe is subjected to pulling tension. The pipe having been cut or detached at a distant point, the engaged section of pipe is pulled axially from the earth, until the cross head and grippers reach a position in proximate relation with the actuating sheaves 4 and ratchet wheel 6, whereupon the pawls 14 and 15 are disengaged by moving the operating lever to an extreme retracted position releasing the chain belts 7 which with the head 8 are readjusted preparatory to another pulling operation. The pulled section of pipe may be cut off or may be bent upwardly so that it will not interfere with the succeeding operations.

By connecting a new section of pipe or tubing to the distant end of the pipe being pulled, the latter may be replaced by pulling the new pipe or tubing into place as the old one is withdrawn.

The pulling chains 7 being spaced apart and operated in unison under equal tension exert a straight uniform pulling action upon the pipe in substantial axial alinement therewith, providing the apparatus has been properly positioned, thereby facilitating the pulling operation and avoiding any tendency to twist, bend or break the pipe. The gripping action of the jaws 9 and 10 is directly proportioned to the resistance of the pipe, increasing as the resistance of the pipe increases. There is no accumulation of slack to become entangled, and the interconnection of the chains into endless formation guides the cross head 8 and gripper jaws in their return movement and support them in alignment with the pipe ready for reengagement therewith. Upon release of the actuating and detent pawls the chains and cross head may be quickly retrieved enabling successive pulling operations to be rapidly performed.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statue the invention has been described in language more or less specific as to structural features, it is to be understood that the invention is not limited to specific details shown, but that the means and construction herein disclosed comprise the preferred form of several modes of putting the invention into effect and the invention is, therefore, claimed in any of its forms or modifications within the legitimate and valid scope of the appended claims.

Having thus described my invention, I claim:

1. In a pipe pulling apparatus, a longitudinal channel shaped supporting member having one end thereof upturned for abutment against a wall, two pairs of sheaves carried thereby, one pair being located adjacent to each end of the supporting member, a pair of parallel endless belts carried by the sheaves, a cross head connecting the belts, spaced gripper jaws pivoted to the cross head, the ends of the belts being connected to the respective gripper jaws in eccentric relation with their pivotal connections, a ratchet wheel fixedly connected with the sheaves of one pair, an actuating lever, a pawl carried thereby for operative engagement with the ratchet wheel, a detent pawl also engageable with the ratchet wheel, and means for releasing the detent pawl by movement of the operating lever to an extreme position of adjustment.

2. In a pipe pulling apparatus, a supporting frame, a cross head carried thereby, relatively adjustable pipe gripping jaws carried by the cross head for engaging a pipe to be pulled, a pair of parallel flexible cables connected to the pipe gripping jaws, and means for progressively retracting the cables.

3. In a pipe pulling apparatus, a main frame, a pair of parallel spaced endless belts, a cross head carried thereby, means for engaging a pipe with the cross head intermediate the endless belts, and means for progressively retracting the belts in unison.

4. In a pipe actuating apparatus, a supporting frame, cross-heads carried thereby, a relatively adjustable pipe gripping jaw carried by each cross-head for engaging the pipe to be moved, a plurality of pairs of parallel actuating members connected to the cross-heads, and means for intermittently advancing and retracting said members.

5. In a pipe pulling apparatus, the combination with a frame of a pipe pulling device, and actuating means therefor mounted upon said frame, said actuating means including a lever carried by the frame, a sheave actuated by the lever and a flexible cable passing over the sheave and engaging the pipe pulling device, said frame including a length of structural steel of channel form, one end of which is upturned at a substantially right angle to the main portion thereof to form an abutment head.

6. In a pipe pulling apparatus, the combination with a pipe engaging device, of a supporting frame, said frame including an elongated base upon which the pipe pulling device is mounted, and an upturned abutment portion at the end of the frame for engagement against the side of an excavation or wall in opposition to the pulling strain of said pipe pulling device, said actuating means including a manually operated lever, and a cable connecting the actuating means to the pipe pulling device.

7. In a pipe pulling apparatus, a supporting frame, a cross head carried thereby, relatively adjustable pipe gripping jaws carried by the cross head for engaging a pipe to be pulled, means connected to the pipe gripping jaws for actuating the same, said means including a flexible cable, and means for progressively retracting the cable.

8. In a pipe pulling apparatus, a main frame, a cross head carried by said frame, means for engaging the pipe with the cross head, a belt for moving the cross head, and means for progressively retracting the belt.

JOHN G. SCOTT.
FRANK L. FRAIZER.